United States Patent Office 3,567,285
Patented Mar. 2, 1971

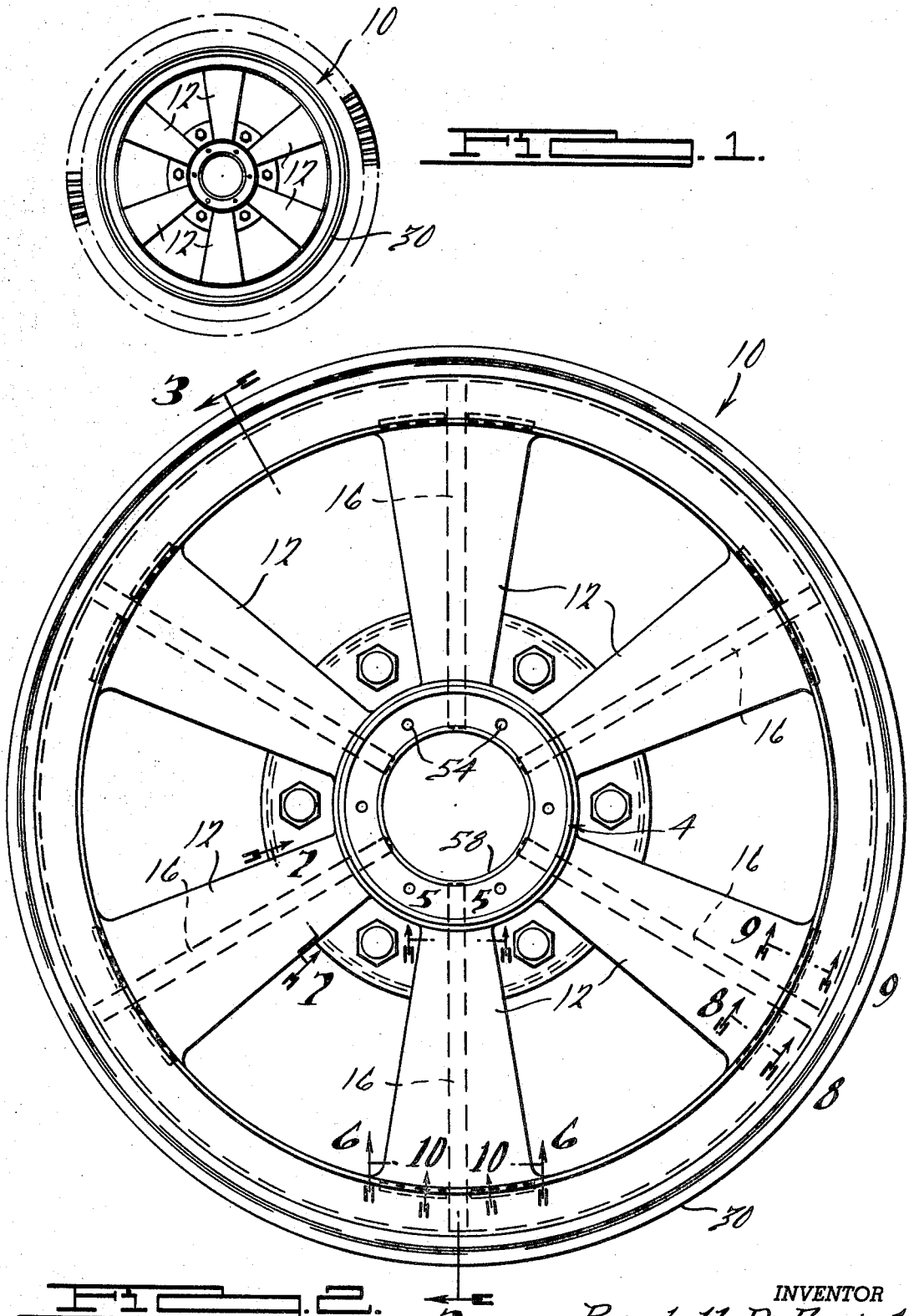

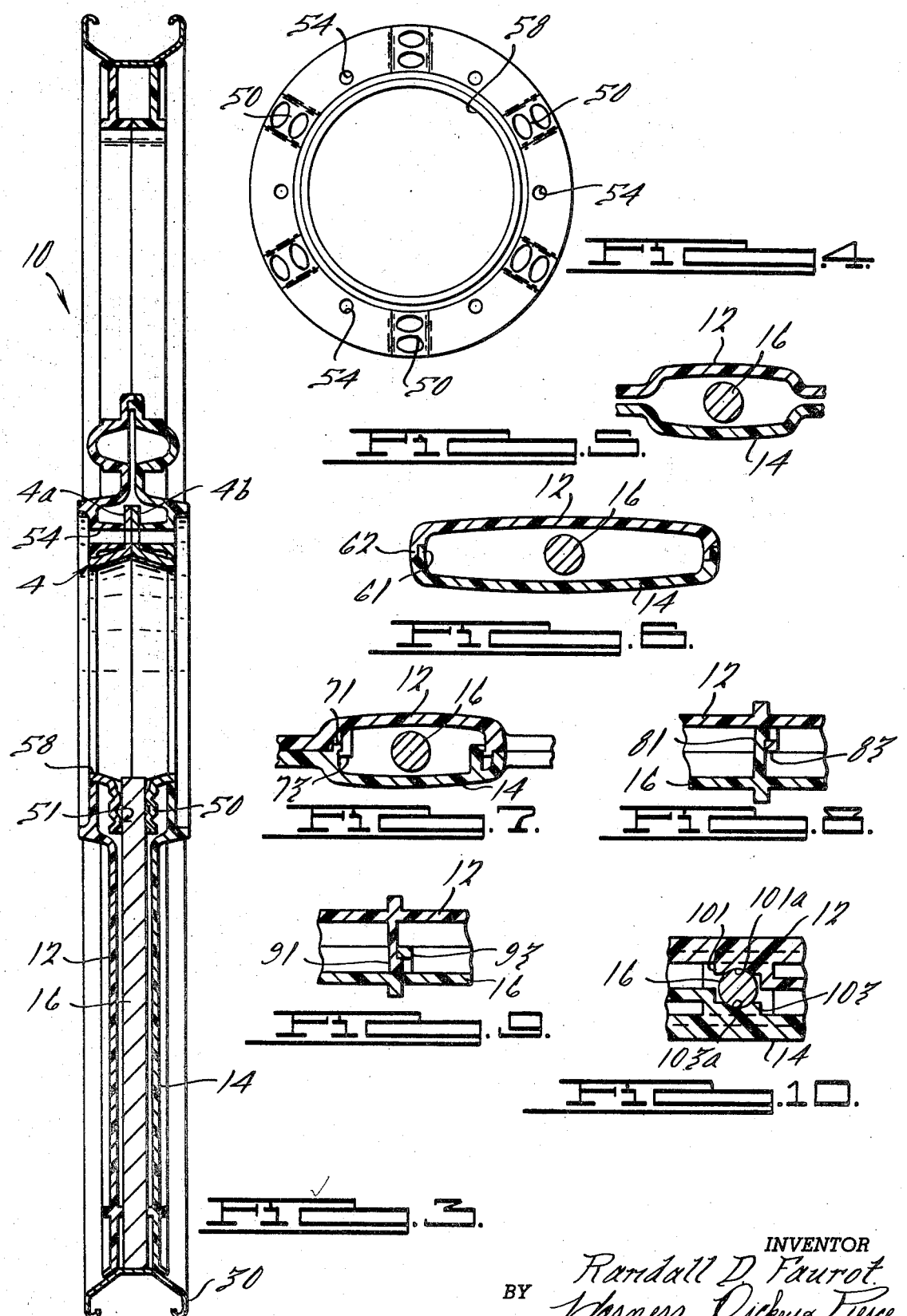

3,567,285
SIMULATED MAGNESIUM BICYCLE
WHEEL AND METHOD
Randall D. Faurot, South Bend, Ind., assignor to
Sheller-Globe Corporation, Detroit, Mich.
Filed Feb. 10, 1969, Ser. No. 797,792
Int. Cl. B60f 7/00
U.S. Cl. 301—37                                            4 Claims

ABSTRACT OF THE DISCLOSURE

A simulated magnesium bicycle wheel comprised of a hub which may be adapted for fitting with numerous alternative conventional bicycle axles or gear hubs, a plurality of spokes with their ends connected to the hub, rim means connected to the other ends of the spokes for mounting a rubber tire, at least two simulated magnesium plastic covers fitted around the spokes and surrounding both sides thereof, means for attaching said plastic covers together around the bicycle wheel to thereby provide the wheel when viewed from either side thereof with the appearance of magnesium, said covers being made of at least one plastic material selected from the group of high impact polystyrene, acrylonitrile butadiene styrene, polypropylene, polyethylene, vinyl, cellulose acetate butyrate, or cellulose acetate propionate, with said covers being formed by injection molding; and, the method of preparing and using said simulated magnesium bicycle wheel.

BACKGROUND OF THE INVENTION

This invention broadly relates to simulated magnesium bicycle wheels or wheels for use on like cycles such as a tricycle, etc.

Accordingly it is the object of this invention to provide an improved simulated magnesium cycle wheel.

Another object of this invention is to provide the method of preparing a simulated magnesium bicycle wheel or like cycle wheels.

Another object of this invention is to provide a unique combination apparatus comprised of a simulated magnesium wheel and bicycle or like cycle.

Still another object of this invention is to provide a unique and highly desirable appearing simulated magnesium wheel which is specifically adapted for use on bicycles, and in particular for use as the rear wheel of a bicycle.

Still another object of this invention is to provide a unique simulated magnesium bicycle wheel for use as the rear wheel and which simulated magnesium wheel may be interchangeably used with either a three speed hub, a five speed hub, or a coaster hub type rear bicycle wheel.

Still another object of the present invention is to provide a method of preparing a simulated magnesium cycle wheel wherein an injection molding process is utilized for the preparation of the simulated magnesium plastic portions of said wheel in which injection molding process flow lines which are detrimental to the appearance of the simulated magnesium finished plastic are prevented from occurring.

Other objects features and advantages of the present invention will become apparent from the subsequent description taken in conjunction with the acompanying drawings.

BRIEF DESCRIPTION OF THE DRAWINGS

FIG. 1 illulstrates a view of a simulated magnesium bicycle wheel in accordance with invention herein;

FIG. 2 illustrates a detailed side view of the plastic wheel cover portion, rim portion, and hub portion of a wheel prepared in accordance with this invention;

FIG. 3 illustrates a cross-sectional view taken along the line 3—3 of FIG. 2;

FIG. 4 illustrates a view of the hub designated with the numeral 4 in FIG. 3;

FIG. 5 illustrates a cross-sectional view along the line 5—5 in FIG. 2;

FIG. 6 illustrates a cross-sectional view along the line 6—6 in FIG. 2;

FIG. 7 illustrates a cross-sectional view along the line 7—7 in FIG. 2;

FIG. 8 illustrates a cross-sectional view along the line 8—8 in FIG. 2;

FIG. 9 illustrates a cross-sectional view along the line 9—9 in FIG. 2; and

FIG. 10 illustrates a cross-sectional view along the line 10—10 in FIG. 2.

SUMMARY OF THE INVENTION

Briefly stated from a method aspect my invention involves the discovery of a method of preparing a simulated magnesium wheel for use on a bicycle or like cycle, said wheel being comprised of a hub, a plurality of spokes with ends connected to the hub, rim means connected to the other ends of the spokes for mounting a tire, at least two simulated magnesium covers, means for attaching said covers together around and on both sides of said wheel to thereby provide the wheel when viewed from either side with the appearance of magnesium, said covers being made of at least one plastic material selected from the group consisting of high impact polystyrene, acrylonitrile butadiene styrene, polypropylene, polyethylene, vinyl, cellulose acetate butyrate, or cellulose acetate propionate, and said covers being formed by injection molding, said method comprising in any acceptable sequence the steps of (1) constructing the spokes, (2) connecting the spokes to the hub, (3) connecting the other ends of the spokes to the rim, (4) injection molding the simulated magnesium plastic covers, and (5) attaching said covers to the wheel.

In another aspect, from a product standpoint, my invention concerns a simulated magnesium bicycle wheel, or like cycle wheel, comprised of a hub, a plurality of spokes with ends connected to the hub, rim means connected to the other ends of the spokes for mounting a tire, at least two simulated magnesium covers, means for attaching said covers together around and on both sides of said wheel to thereby provide the wheel when viewed from either side with the appearance of magnesium, said covers being made of at least one plastic material selected from the group consisting of high impact polystyrene, acrylonitrile butadiene styrene, polypropylene, polyethylene, vinyl, cellulose acetate butyrate, or cellulose acetate propionate, and said covers being formed by injection molding.

This invention also comprises a unique combination wheel-cycle apparatus wherein at least one of the wheels of said cycle is a simulated magnesium wheel having a structure as discovered and disclosed herein. This invention also comprises the method of using a simulated magnesium cycle wheel.

DESCRIPTION OF PREFERRED EMBODIMENTS

Set forth hereinafter is a description of the invention relative to the drawing disclosures thereof, however, this description is illustrative only and should not be taken as being any more than exemplary of one or more satisfactory embodiments for carrying out the invention.

FIGS. 1–3 illustrate a simulated magnesium bicycle wheel generally designated 10. The wheel 10 is comprised of two plastic cover portions designated 12 and 14 with these plastic cover portions 12 and 14 surrounding from both sides or overlying the metal spokes 16. The spokes are connected at their inner ends to a metal stamping or hub designated 4.

The other ends of the spokes 16 are connected to a metal rim designated 30.

The spokes may be suitably connected at each of their ends to the hub 4 and rim 30 respectively by any suitable means such as welding, etc.

FIG. 4 illustrates a detailed view of the hub and it is seen that the hub contains a generally corrugated section 50 which gives a better gripping contact with the spokes 16 as designated by the surface contact portion 51 (FIG. 3). The apertures 54 in the hub may be used for the holding of nuts and bolts, not shown, which when tightened press the two oppositely opposed hub sections 4a and 4b into a generally clamped together position. The large aperture 58 through the center of the hub is adapted to receive either a three speed hub, five speed hub or coaster hub when the wheel in accordance with this invention is used as the rear bicycle wheel.

A rubber tire, not shown, may of course suitably be mounted on the exterior of the rim 30.

FIG. 5 illustrates a cross-sectional view taken along the line 5—5 in FIG. 2 and illustrates that the two plastic covers 12 and 14 surround the spoke 16 and in general it should be stated that in the structure of the type shown in the drawings the metal spokes 16 are hidden from view after the simulated magnesium bicycle wheel of the drawings is exemplified.

FIG. 6 illustrates a view along the line 6—6 of FIG. 2 showing that matable abutments 61 and 62 are positioned at each end of the plastic covers in this area of the covers for the purpose of aligning and facilitating the interlocking of the plastic covers 12 and 14 when the covers are clamped together to cover the spokes 16.

FIG. 7 illustrates a view along the line 7—7 of FIG. 2 disclosing that at this portion of the plastic covers there is an interlocking action between the right and left hand oriented L-shaped members 71 and 73 which members 71 and 73 when forced together function to interlock the plastic covers together.

FIG. 8 illustrates a cross-sectional view along the line 8—8 disclosing that in this area of the plastic covers 12 and 14 there is an interlock formed by the matable members 81 and 83 which also grip together or attach to one another when the plastic covers 12 and 14 are pressed together to surround and hide from view the metal spokes 16.

FIG. 9 is another cross-sectional view along the line 9—9 of the interlocking or attaching means used to put the plastic covers together around the wheel 10 as shown in FIG. 2. In FIG. 9 the interlocking L-shaped members are designated 91 and 93.

FIG. 10 illustrates a cross-sectional view along the line 10—10 in FIG. 2 disclosing that corresponding abutment means 101 and 103 are used to position the plastic covers 12 and 14 such that they are centered relative to the metal spokes 16.

The centering action takes place due to the locator surfaces designated 101a and 103a which act to equidistantly locate the plastic covers 12 and 14 relative to the metal spoke 16.

It should be understood that each of the interlocking means or attaching means as well as the locator means described hereinabove are generally correspondingly located around the wheel such that the plastic covers 12 and 14 may be securely interlocked together and positioned relative to the wheel such that the metal spokes are covered and hidden from view and such that the plastic covers are generally securely and properly fastened to the wheel 10.

The plastic material from which the covers 12 and 14 are made should be a plastic material selected from the group consisting of high impact polystyrene, acrylonitrile butadiene styrene, polypropylene, polyethylene, vinyl, cellulose acetate butyrate, or cellulose acetate propionate.

A simulated magnesium coloring material is inserted into this plastic material prior to injection molding of the plastic covers. This simulated magnesium coloring material may suitably be either an afflair material or a metallic additive material which when added to any of the plastic materials designated above will produce a simulated magnesium appearance after molding of the plastic. For a particular example the material "Cycolac" of the Marbon Chemical Company may be used and this is an ABS plastic of injection molding grade which may be adapted to contain a silver metallic pigment for the purpose of giving a simulated magnesium appearance to the molded ABS plastic.

However, it is also possible to use a color additive in the preparation of the simulated magnesium cycle wheel herein which additive is comprised of an afflair material as the coloring additive. Such afflair materials have been discovered to substantially reduce or overcome the problem of flow lines which in the past have occurred in injection molded simulated magnesium plastic parts. These afflair materials are generally comprised of titanium dioxide precipitated onto the surface of mica particles.

Most satisfactory results in producing a simulated magnesium appearance in the molded plastic covers may be obtained by using an aluminum powder additive of very finely divided particles size, which additive is incorporated into the plastic material prior to molding thereof. It is essential that the particle size of the aluminum particles or other metallic coloring particles not be too large in that if the particle size is overly large then the molding operation results in an unsatisfactory product.

The preferred plastic material for forming the plastic covers disclosed herein is acrylonitrile butadiene styrene. One particularly acceptable ABS plastic used in forming simulated magnesium wheels of this invention is Tybrene available from the Dow Chemical Company. The physical properties of Tybrene are set forth as follows:

| Property—units | ASTM test method | Temperature, ° F. | | | |
| --- | --- | --- | --- | --- | --- |
| | | 150 | 73 | 0 | −20 |
| Tensile strength, lb.-ft./in.² | D638-61T | 2,550 | 3,300 | 4,300 | 5,000 |
| Yield, kg.-ft./cm.² | | 180 | 230 | 300 | 350 |
| Tensile strength, lb.-ft./in.² | D638-61T | 2,250 | 3,400 | 4,800 | 5,600 |
| Ultimate, kg.-ft./cm.² | | 160 | 240 | 335 | 395 |
| Elongation, yield, percent | D638-61T | 1.1 | 1.0 | 1.3 | 1.7 |
| Tensile modulus, lb.-ft./in.² | D638-61T | 240,000 | 320,000 | 330,000 | 340,000 |
| Tensile modulus, kg.-ft./cm.² | | 16,900 | 22,500 | 23,200 | 23,900 |
| Izod impact, ft.-lbs./in. of notch | D256-56 | 1.4 | 1.2 | 1.0 | 0.9 |
| ⅛" bar, notched cm.-kg.-ft./cm. of notch | | 7.6 | 6.5 | 5.4 | 4.9 |

The simulated magnesium bicycle wheel disclosed herein is unique in that it is built such that the plastic wheel covers surround on both sides the metal inserts or spokes which support the rim and rubber tire portions of the wheel. The simulated magnesium bicycle wheel disclosed herein is also unique in that it is adaptable to receive either a three speed hub, five speed hub or coaster hub when the wheel is used as the rear wheel of a bicycle. Of course numerous other hubs may also be used with the invention herein dependent on the particular cycle to which the invention is applied.

Furthermore the invention herein is unique and advantageous from the standpoint that it has been discovered that when the method of preparing a simulated magnesium plastic wheel in accordance with the disclosure herein is followed, then flow lines which normally occur in the injection molding of the plastic materials disclosed above do not occur and a highly pleasing and desirable simulated magnesium structure is obtained.

Still further the invention herein is considered unique in that the discovery has been made that from a design appearance standpoint or simulated appearance standpoint the number of spokes in the simulated magnesium bicycle wheel should be limited numerically such that the number of spokes stays within the range of about 3 to about 16. The concept of the invention in this regard is that in order to simulate the appearance of a true magnesium wheel numerous bicycle spokes are unnecessary, that is, the numerous spokes which appear in a conventional bicycle wheel if covered over by some form of simulated magnesium cover does not leave the proper amount of void space to give a proper design appearance as would appear in a real magnesium wheel for use on bicycles. The discovery herein has been made that when the number of spokes is limited to between 3 and 16 then a proper simulated magnesium wheel cover system is possible as disclosed hereinabove. Previously the number of spokes in the simulated magnesium wheel, from the most suitable design standpoint has been found to be 6 as disclosed in the drawings. However, a true simulated magnesium bicycle wheel appearance is possible in accordance with this invention generally using a bicycle wheel as a basis for the structure which wheel would contain in any way from 3 to 16 spokes of the type disclosed herein.

What is claimed is:

1. A method of preparing a simulated magnesium wheel for use on a bicycle or like cycle, said wheel being comprised of:
   a hub,
      between three and sixteen spokes with ends connected to the hub,
      rim means connected to the other ends of the spokes for mounting a tire,
      at least two simulated magnesium covers,
      a plurality of interlocking means positioned on each of said covers for attaching said covers together around and on both sides of said wheel in a proper centrally located position to thereby provide the hub and rim means when viewed from either side with the appearance that the hub and rim means are of magnesium construction,
   said covers being made of at least one plastic material selected from the group consisting of high impact polystyrene, acrylonitrile butadiene styrene, polypropylene, polyethylene, vinyl, cellulose acetate butyrate, or cellulose acetate propionate, and
   said plastic material being effective through color and appearance to simulate a magnesium construction for the hub and rim means,
   said covers being formed by molding,
   said interlocking means being further characterized as including, means associated with said covers for surrounding and securing same on each side of the spokes,
   simulated magnesium coloring material means associated with said plastic material for producing a magnesium color in the molded plastic;
said method comprising the steps of:
   constructing the spokes,
   connecting the spokes to the hub,
   connecting the other ends of the spokes to the rim,
   molding the simulated magnesium plastic covers,
   attaching said covers to the wheel through the use of said interlocking means.

2. The method of claim 1 wherein said plastic is acrylonitrile butadiene styrene.

3. A simulated magnesium bicycle wheel, or like cycle wheel comprised of:
   a hub,
      between three and sixteen spokes with ends connected to the hub,
      rim means connected to the other ends of the spokes for mounting a tire,
      at least two simulated magnesium covers,
      a plurality of interlocking means positioned on each of said covers for attaching said covers together around and on both sides of said wheel in a proper centrally located position to thereby provide the hub and rim means when viewed from either side with the appearance that the hub and rim means are of magnesium construction,
   said covers being made of at least one plastic material selected from the group consisting of high impact polystyrene, acrylonitrile butadiene styrene, polypropylene, polyethylene, vinyl, cellulose acetate butyrate, or cellulose acetate propionate, and
   said plastic material being effective through color and appearance to simulate a magnesium construction for the hub and rim means,
   said covers being formed by molding,
   said interlocking means being further characterized as including, means associated with said covers for surrounding and securing same on each side of the spokes,
   simulated magnesium coloring material means associated with said plastic material for producing a magnesium color in the molded plastic.

4. The wheel of claim 3 wherein said plastic is acrylonitrile butadiene styrene.

References Cited

UNITED STATES PATENTS

| | | | |
|---|---|---|---|
| 2,115,183 | 4/1938 | Sinclair | 301—37 |
| 2,428,469 | 10/1947 | Plant | 301—37 |
| 3,004,798 | 10/1961 | Tylle | 301—37 |
| 3,317,246 | 5/1967 | Wester | 301—37 |

FOREIGN PATENTS

| | | | |
|---|---|---|---|
| 298,402 | 10/1928 | Great Britain | 301—37 |

RICHARD J. JOHNSON, Primary Examiner

U.S. Cl. X.R.

29—159.03; 301—79